(12) United States Patent
Weber

(10) Patent No.: US 6,798,369 B1
(45) Date of Patent: Sep. 28, 2004

(54) PRECISION, WIDE BAND PULSE WIDTH MODULATOR FOR DIGITAL TO ANALOG CONVERSION

(75) Inventor: Charles F. Weber, Dexter, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/637,413

(22) Filed: Aug. 8, 2003

(51) Int. Cl.[7] ............................................... H03M 1/66
(52) U.S. Cl. ....................................... 341/144; 341/152
(58) Field of Search ................................. 341/144, 145, 341/152

(56) References Cited

U.S. PATENT DOCUMENTS

| | | |
|---|---|---|
| 4,193,060 A | 3/1980 | Slavin et al. |
| 4,595,910 A | 6/1986 | Wine |
| 4,636,773 A | 1/1987 | Lewis et al. |
| 4,998,108 A | 3/1991 | Ginthner et al. |
| 5,633,625 A | 5/1997 | Gaub et al. |
| 5,764,172 A | 6/1998 | Rodal |
| 6,052,076 A | 4/2000 | Patton, III et al. |
| 6,191,722 B1 | 2/2001 | Briefer |
| 6,459,398 B1 * | 10/2002 | Gureshnik et al. .......... 341/144 |
| 6,476,711 B2 | 11/2002 | Kitamura et al. |
| 6,606,046 B2 * | 8/2003 | Kanno ....................... 341/144 |

* cited by examiner

Primary Examiner—Brian Young
(74) Attorney, Agent, or Firm—Brinks Hofer Gilson & Lione

(57) ABSTRACT

A system for generating an analog signal to produce sound using a precision multiple pulse width modulator circuit is disclosed. The system includes a control circuit, a pulse width modulation circuit, and a mixer circuit. The control circuit includes a memory for storing sound tables. The control circuit senses an event, accesses the sound table associated with the event, retrieves an entry value from the sound table, and communicates the entry value with the pulse width modulation circuit. The pulse width modulation circuit includes (I) number of pulse width modulators and the entry value is represented by a number having (I) places where each pulse width modulator represents a place of the number representing the entry value. The mixer circuit includes multiple resistors. Each resistor is connected to a pulse width modulator from the pulse width modulation circuit on one end and the common node of the mixing circuit on the other end. The resistors have the effect of scaling the signal from each pulse width modulator thereby creating an analog signal at the common node corresponding to the entry value of the sound subtable.

33 Claims, 3 Drawing Sheets

PRECISION, WIDE BAND PULSE WIDTH MODULATOR FOR DIGITAL TO ANALOG CONVERSION

BACKGROUND

1. Field of the Invention

The present invention generally relates to systems and methods for creating analog signals to produce sound.

2. Description of Related Art

Many systems exist for creating an automobile chime in response to an event. Different sounding chimes are provided for events such as seatbelt unbuckled, driver door open, key in ignition. Prior art systems use a control circuit to interpret events and associate the event with a signal having a prescribed amplitude and frequency corresponding to a particular sound of chime. The control circuit communicates the signal to a pulse width modulator. The pulse width modulator creates an electrical signal corresponding to the sound of the chime. The electrical signal is amplified and communicated to a speaker to synthesize the chime. However, the chime is monotone due to circuit design and the limited bandwidth of the pulse width modulator. Improvements have been made to existing systems by introducing a decaying factor to vary the tone of the chime. However, the chimes are still synthetic and similar in tone due to the limited bandwidth of the pulse width modulator.

In view of the above, it is apparent that there exists a need for a system for producing automobile chimes with improved band width over the prior art designs.

SUMMARY

In satisfying the above need, as well as overcoming the enumerated drawbacks and other limitations of the related art, in an embodiment of the present invention a system for creating an analog signal to produce a sound using a precision multiple pulse width modulator circuit is provided.

In an embodiment of the present invention, the system includes a control circuit, a pulse width modulation circuit, and a mixer circuit. The control circuit includes a memory for storing sound tables. The control circuit senses an event, accesses the sound table associated with the event, retrieves an entry value from the sound table, and communicates the entry value with the pulse width modulation circuit. The pulse width modulation circuit includes (I) number of pulse width modulators and the entry value is represented by a number having (I) places where each pulse width modulator represents a place of the number representing the entry value.

The mixer circuit includes multiple resistors. Each resistor is connected to a pulse width modulator from the pulse width modulation circuit on one end and the common node of the mixing circuit on the other end. The resistors have the effect of scaling the signal from each pulse width modulator thereby creating an analog signal at the common node corresponding to the entry value of the sound table.

In yet another embodiment of the present invention a low pass filter circuit is provided. The low pass filter reduces noise in the analog signal from the common node and in an audio amplifier circuit. Accordingly, the analog signal is appropriately scaled before reaching the audio output device.

The sound tables can store data corresponding to high fidelity chimes such as music or even voice. The use of the precision multiple pulse width modulator circuit according to the present invention provides the additional band width to produce the high fidelity chimes without significantly impacting the cost of the system.

Further aspects, features and advantages of this invention will become readily apparent to persons skilled in the art after a review of the following description, with reference to the drawings and claims that are appended to and form a part of this specification.

DEFINITIONS

Duty cycle is the ratio of the logic high period divided by the total period of the pulse width modulated signal. The Duty Cycle ranges from 0 to 1 and can also be described as the average value of the pulse width modulated signal.

The Duty Factor is the maximum value the Duty Cycle is defined to have. The duty factor ranges between 0 and 1.

The resolution of a pulse width modulator (PWM) output is the number of discrete values the PWM can have including the value zero. For instance, an eight bit pulse width modulator has a resolution of 256 states with a numerical range of 0 to 255.

A balanced multiple PWM digital to analog converter (D/A) is defined as having multiple PWMs where each of the PWMs have the same resolution. Conversely, an unbalanced multiple PWM D/A is defined as a D/A with multiple PWMs where at least one of the PWMs does not have the same resolution as the other PWMs.

The full range multiple PWM D/A is defined as a D/A with multiple PWMs where all PWMs have a duty factor of one. Conversely, a partial range multiple PWM D/A is defined as a D/A with multiple PWMs where at least one of the PWMs has a duty factor of less than one.

DETAILED DESCRIPTION

Figure 1:
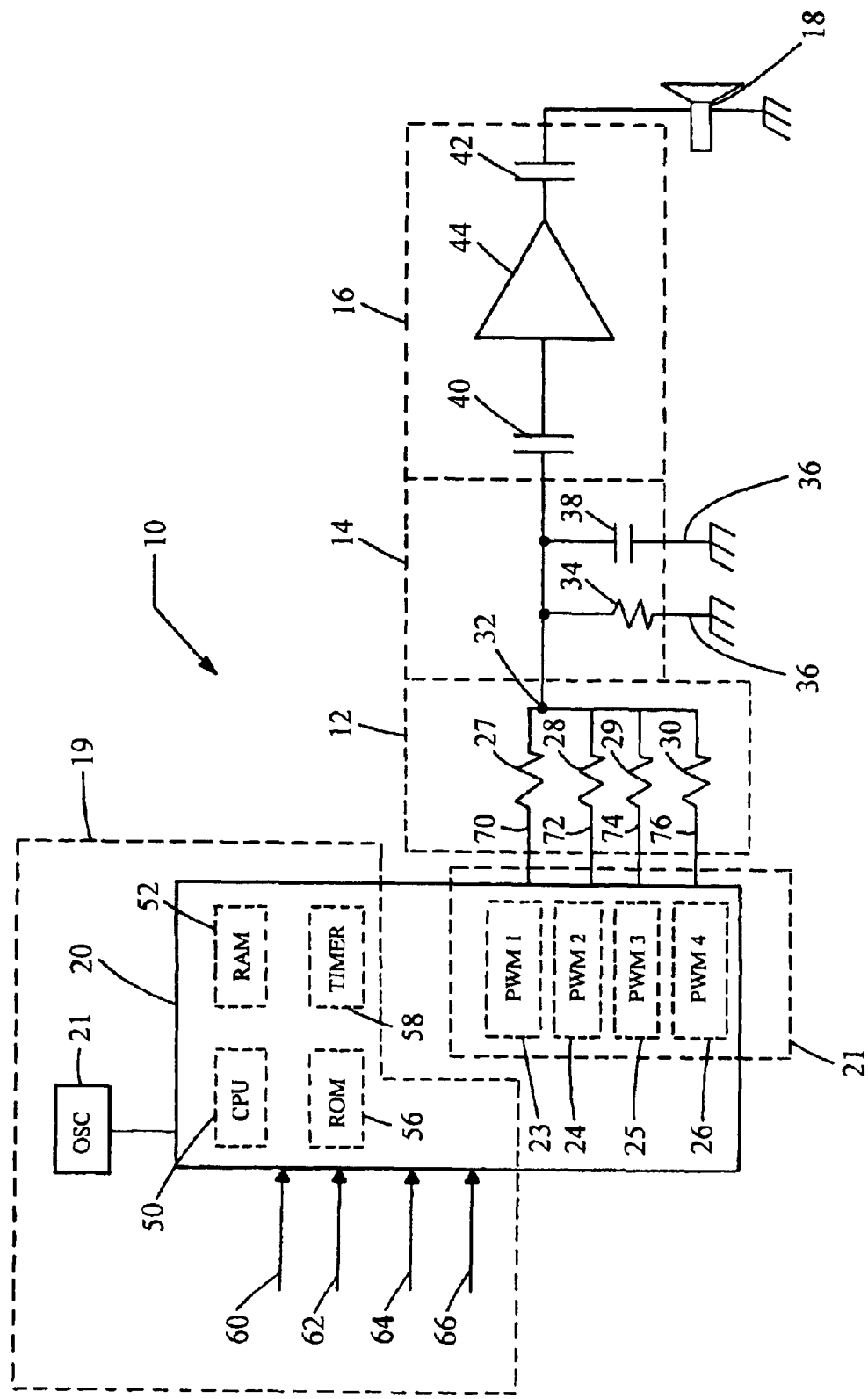
FIG. 1 is a schematic diagram view of a system for generating an analog signal to produce sound according to an embodiment of the present invention.

Now referring to FIG. 1, a system embodying the principles of the present invention is illustrated therein and designated at 10. The system 10 includes a control circuit 19, a pulse width modulation circuit 21, a mixer circuit 12, low pass filter circuit 14, an audio amplifier 16, and an audio output device 18.

The control circuit 19 includes an oscillator 22 for driving a micro-controller 20. Micro-controller 20 has a CPU 50, a random access memory (RAM) 52, a read only memory (ROM) 56, and a timer 58. A sound table is stored in the RAM 52 or ROM 54 of the micro-controller 20. The sound table contains entry values corresponding to a sound to be played at an associated time. In addition, the control signals 60, 62, 64 and the network connection 66 are also associated with the control circuit 19. The control signals 60, 62, 64 are indicative of events for which the system is designed to create distinct chime sounds to notify the operator of the event. The micro-controller 20 is a commercially available component such as MC9512DP256 available from Motorola Inc. of Schaumburg, Ill. The micro-controller 20, as shown in FIG. 1, is selected to include the pulse width modulation circuit 21.

With continuing reference to FIG. 1, pulse width modulator circuit 21 includes a first PWM 23, a second PWM 24, a third PWM 25, and a fourth PWM 26. Although, one skilled in the art can appreciate that more or less than four PWMs may be used in pulse width modulation circuit 21.

Figure 3:
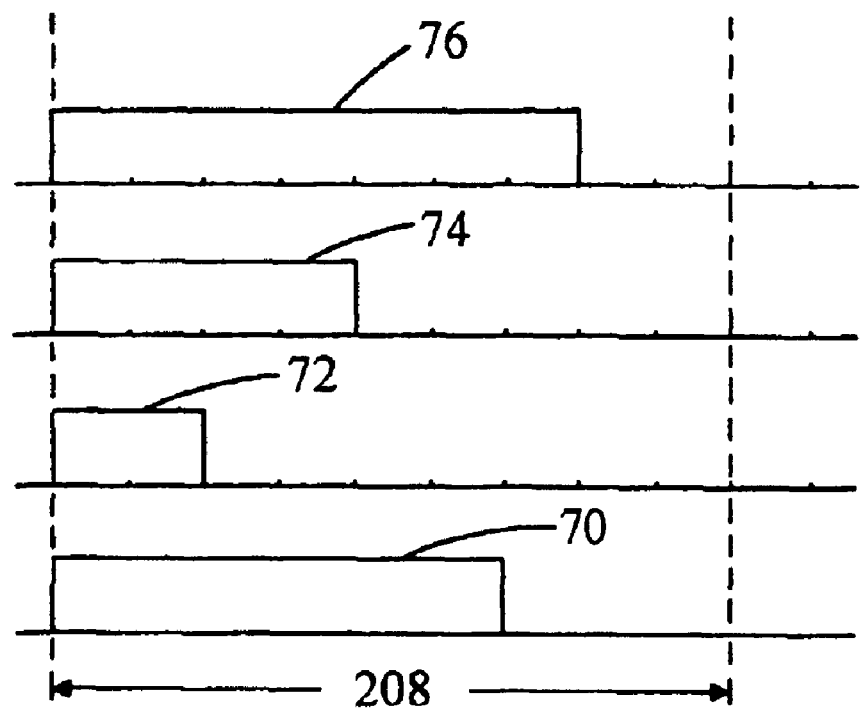
FIG. 3 is a graph showing an example of the signals generated by the pulse width modulators in FIG. 1 according to an embodiment in the present invention.

To provide a greater bandwidth and higher resolution, the present invention utilizes multiple pulse width modulators 23–26 to generate a chime upon the detection of an event. The entry values are segmented and provided to the multiple pulse width modulators. Each pulse width modulator represents a numerical "place" in the entry value. For example, four pulse width modulators could be used to represent an entry value having a numerical range of 0 to 9999. Each pulse width modulator would count from 0 to 9 representing its respective place in the entry value. Since each PWM has the same resolution, this example is a balanced multiple PWM D/A. The first PWM pulse width modulator would be allocated to the "ones place", the second PWM would be allocated to the "tens place", the third PWM would be allocated to the "hundreds place" and the fourth PWM would be allocated to the "thousands place". Each of the pulse width modulators would count in common decimal form. By example, the entry value 7426 would cause the first PWM to produce a signal on line 70 having a 6 count pulse, the second PWM to produce a signal on line 72 having a 2 count pulse, the third PWM to produce a signal on line 74 having a 4 count pulse, and the fourth PWM to produce a signal on line 76 having a 7 count pulse, illustrated in FIG. 3. The period 208 corresponds to a full 100% duty cycle.

Alternatively, pulse width modulators may also have different resolutions indicating an unbalanced multiple PWM D/A. For example, two pulse width modulators may be used as a D/A converter having a numerical range of 0 to 999 where the first PWM counts from 0 to 39 in the ones place and the second PWM counts from 0 to 24 in the 40ths place. Thus a count of 19 on the second PWM and a count of 26 on the first PWM has a decimal value of 19×40+26= 768. The Full Scale Decimal Value of the two pulse width modulators (24) and (39), a decimal value of 24×40+39= 999.

The mixer circuit 12 must be designed in conjunction with the pulse width modulator circuit 21 for producing an analog signal to produce sound. The mixer circuit 12 includes a resistor 27 in communication with first pulse width modulator 23, a resistor 28 in communication with second pulse width modulator 24, a resistor 29 in communication with third pulse width modulator 25, and a resistor 30 in communication with fourth pulse width modulator 26. Each of the resistors 27, 28, 29, 30 are also connected to a common node 32. Selection of the resistors 27, 28, 29, 30 are important to provide the proper scaling of the pulse width modulator signals such that each pulse width modulator properly represents the correct numerical place in the entry value.

Resistors are selected based on the counting scheme of the PWMs. The resistors correspond to the weighting of the "place" represented by each PWM. Consider four PWMs are mixed to form the arbitrary four "place" number LMNO. Where:

L has a numerical count range of 0 to W
M has a numerical count range of 0 to X
N has a numerical count range of 0 to Y
O has a numerical count range of 0 to Z O is associated with the least significant or first PWM, while L is associated with the most significant or fourth PWM. The number LMNO may be converted to decimal as follows:

Decimal Value: $DV = L*(X+1)*(Y+1)*(Z+1) + M*(Y+1)*(Z+1) + N*(Z+1) + O$

Full Scale Decimal Value:

$$FSV = W*(X+1)*(Y+1)*(Z+1) + X*(Y+1)*(Z+1) + Y*(Z+1) + Z \qquad (1)$$

This form may be expanded to any number of "places" and resolutions.

When mixing PWMs to form a wide band D/A converter using the construction of FIG. 1, the resultant output is a stepped mixture of analog levels. For the D/A converter to provide useful output, the integrated area of the composite waveform must equal the value of the number LMNO. The waveform may further be filtered as required to produce a smooth output. To achieve a precise waveform area, the weighting of the resistors are determined.

By normalizing equation (1) to the most significant term and taking the reciprocal of the coefficient for each term. The ratios of the resistors can be determined by $R1 = (W*(X+1)*(Y+1)*(Z+1))/Z$ for the first PWM $R2 = (W*(X+1)*(Y+1)*(Z+1))/(Y*(Z+1))$ for the second PWM $R3 = (W*(X+1)*(Y+1)*(Z+1))/(X*(Y+1)*(Z+1))$ for the third PWM $R4 = (W*(X+1)*(Y+1)*(Z+1))/(W*(X+1)*(Y+1)*(Z+1)) = 1$ for the fourth PWM R1 is associated with the least significant PWM and R4 with the most significant PWM.

In a first example, the resistor ratios are calculated for a Balanced Full Range multi-PWM D/A converter with a resolution of 10,000 using four balanced PWMs each having a numerical range of 0 to 9. This will count conventional decimal from 0 to 9,999. Then W=X=Y=Z=9 and:

$R1 = (W*(X+1)*(Y+1)*(Z+1))/Z = 9*10*10*10/9 = 1000$ $R2 = (W*(X+1)*(Y+1)*(Z+1))/(Y*(Z+1)) = 9*10*10*10/(10*9) = 100$ $R3 = (W*(X+1)*(Y+1)*(Z+1))/(X*(Y+1)*(Z+1)) = 9*10*10*10/(10*10*9) = 10$ $R4 = (W*(X+1)*(Y+1)*(Z+1))/(W*(X+1)*(Y+1)*(Z+1)) = 1$

In a second example, the resistor ratios are calculated for a Balanced Full Range multi-PWM D/A converter with a resolution of 10,000. However, only 3 balanced PWMs are used. Since the closest integer cube root of 10,000 is 22 then X=Y=Z=21 for the three place where number MNO. M has a numerical count range of 0 to X; N has a numerical count range of 0 to Y; O has a numerical count range of 0 to Z; and:

$R1 = (X*(Y+1)*(Z+1))/Z = 21*22*22/21 = 484$ $R2 = (X*(Y+1)*(Z+1))/Y*(Z+1) = 21*22*22/(22*21) = 22$ $R3 = (X*(Y+1)*(Z+1))/(X*(Y+1)*(Z+1)) = 1$

For this example the resolution exceeds 10,000 and is $22^3 = 10,648$. It is not exactly 10,000. The Full Scale Decimal Value from equation 1: $FSV = X*(Y+1)*(Z+1)*Y*(Z+1) + Z = 21*22*22 + 21*22 + 21 = 10,647$. The next example shows unbalanced PWMs having variable counts for each place to solve this issue.

In a third example, the resistor ratios are calculated for an Unbalanced Full Range multi-PWM D/A having a resolution exactly 10,000 using three PWMs. Let W=24, Y=19 and Z=19. Then the resolution is $25*20*20 = 10,000$ and the Full Scale Decimal Value from the above equation: $FSV = X*(Y+1)*(Z+1) + Y*(Z+1) + Z = 24*20*20 + 19*20 + 19 = 9,999$ and:

$R1=(X*(Y+1)*(Z+1))/Z24*20*20/19=505.2632$ $R2=(X*(Y+1)*(Z+1))/Y*(Z+1)=24*20*20/(19*20)=25.2632$ $R3=(X*(Y+1)*(Z+1))/(X*(Y+1)*(Z+1))=1$

In a fourth example, the resistor ratios are calculated for a fourteen bit Balanced Full Range multi PWM D/A using 2 PWMs. The most significant PWM is seven bits wide and counts 0 to 127 and the least significant PWM is 7 bits wide and counts 0 to 127. Therefore Y=127 and Z=127 where for the two place number NO: N has a numerical count range of 0 to Y and O has a numerical count range of 0 to Z. The resolution becomes 128*128=16,384 and the Full Scale Decimal Value from the above equation: $FSV=Y*(Z+1)+Z=127*128+127=16,383$ and:

$R1=Y*(Z+1)/Z=127*128/127=128$ $R2=Y*(Z+1)/Y*(Z+1)=1$

In a fifth example, binary example for the resistor ratios are calculated for of a 14-bit Unbalanced Full Range multiple PWM D/A using 2 PWMs. The most significant PWM is six bits wide and counts 0 to 63. The least significant PWM is 8 bits wide and counts 0 to 255. Then Y=63 and Z=255. The resolution becomes 64*256=16,384 and the Full Scale Decimal Value from the above equation: $FSV=63*256+255=16,383$ and:

$R1=Y*(Z+1)/Z=63*256/255=63.24706$ $R2=Y*(Z+1)/Y*(Z+1)=1$

A multiple PWM D/A where the duty factor is less than one is called a partial range multiple PWM D/A. When the range of a PWM output is less than 100% duty cycle, the weighting factors for equation (1) must be adjusted. For the arbitrary four place number LMNO having arbitrary limits on the duty factor from 0 to 1, LMNO is defined:

L as a numerical count range of 0 to W and a PWM duty factor limit of A.

M as a numerical count range of 0 to X and a PWM duty factor limit of B.

N as a numerical count range of 0 to Y and a PWM duty factor limit of C.

O as a numerical count range of 0 to Z and a PWM duty factor limit of D.

O is associated with the first PWM and L is associated with the fourth PWM. From the above Full Scale Decimal Value equation 1 and adjustments for duty factor:

$$FSV=W*(X+1)*(Y+1)*(Z+1)/A+X*(Y+1)*(Z+1)/B+Y*(Z+1)C+Z/D (2)$$

The ratios of the resistors according to the 4 PWM relationship are:

$R1=(W*(X+1)*(Y+1)*(Z+1))*D/Z*A$ for the first PWM $R2=(W*(X+1)*(Y+1)*(Z+1))*C/(Y*(Z+1)*A)$ for the second PWM $R3=(W*(X+1)*(Y+1)*(Z+1))*B/(X*(Y+1)*(Z+1)*A)$ for the third PWM $R4=(W*(X+1)*(Y+1)*(Z+1)*A/(W*(X+1)*(Y+1)*(Z+1)*A)=1$ for the fourth PWM R1 is associated with the least significant PWM and R4 with the most significant PWM.

In a sixth example, resistor ratios are calculated of a Unbalanced Partial Range multiple PWM D/A having a resolution of 10,000 using 2 PWMs. The most significant PWM has a resolution of 50 and counts 0 to 49 and the least significant PWM having a resolution of 200 and counts 0 to 199. Then Y=49 and Z=199. The total resolution becomes 50*200=10,000. Both PWMs have the same period and will be implemented using binary counters each having 256 states. Each count of the most significant PWM will be 4 times the duration of a single count of the least significant PWM and thus the most significant PWM will have a duty factor of C=49*4/255=196/255. The least significant PWM will have a duty factor of D=199/255. The Full Scale Decimal Value of equation 2:

$FSV=Y*(Z+1)/C+Z/D=49*200(196/255)+199/(199/255)=13005$ and:

$R1=Y*(Z+1)*D/(Z*C)=49*200*(199/255)/199*(196/255)=50$ for the least significant PWM.

$R2=Y*(Z+1)*C/Y*(Z+1)*C=1$ for the most significant PWM.

In a seventh example, the resistor ratios are calculated for a Balanced Partial Range multiple PWM 12-bit D/A using 2PWMs. The most significant PWM is 6 bits and counts 0 to 63 and the least significant PWM is 6 bits wide and counts 0 to 63. Then Y=63 and Z=63. The resolution becomes 64*64=4096. Both PWMs each have 256 states. Because both PWMs are 8 bits and count to only 63 the duty factor is less than 1 and is limited to C=D=63/255. The Full Scale Decimal Value from equation 2: $FSV=63*64/(63/255)+63(63/255)=16575$ and:

$R1=(63*64*(63/255))/((63*(63/255)))=64$ $R2=1$

In another embodiment, particularly practical in a high speed dual PWM D/A for audio output is provided. Resistor tolerances place a practical limit on the precision achievable using simple off the shelf parts. One percent is common and low cost. A one percent part will still have variance beyond 1% considering temperature drift and aging. For an audio chime application, it will be assumed the maximum desirable ratio for the resistors is about sixty-four. This provides for a small margin beyond the 1% tolerance of the resistors. A second consideration is the PWM hardware. Many microcontrollers commonly contain PWM output devices. They are often very flexible in their possible configurations but it is desirable for them to have the same periods. This is a practical consideration since micro-controller updates the values of the multiple PWMs synchronously to prevent latency noise at the outputs.

In this embodiment an Unbalanced Partial Range Multi-PWM D/A converter having 14-bits of resolution is provided. Both PWMs have the same period and 256 states. The most significant PWM is six bits counting 0 to 63 where each count occupies four time slots with a duty factor of 4*63/255. The least significant PWM is eight bits wide, counts 0 to 255 with a duty factor of 1. Then, Y=63, C=252/255, Z=255 and D=1. The FSV=63*256/(252/255)+255=16575. The resolution is 64*256=16,384. From this the resistor ratios are:

$R1=(63*256*(252/255))/255*1=64$ $R2=1$

As one skilled in the art can appreciate different combinations of resistor values, PWM resolutions, and PWM duty factors maintaining the relationship described above may be used in accordance with the present invention. In addition, the relationship described above can be expressed in terms of a series to accommodate any number of pulse width modulators.

Now referring again to FIG. 1, the low pass filter circuit 14 is connected to the common node 32 of the mixer circuit 12. The low pass filter circuit 14 includes resistor 34 and capacitor 38. Resistor 34 is connected between the common node 32 and a low impedance reference voltage such as an electrical ground 36. The resistor 34 scales the analog signal generated at the common node 32. Capacitor 38 is connected between the common node 32 and an electrical ground 36. The capacitor 38 has the effect of filtering out low frequency noise on the analog signal generated at common node 32.

The audio amplifier circuit 16 is connected to the scaling and low pass filter circuit 14. The audio amplifier circuit 16 includes capacitor 40, audio amplifier buffer circuit 44, and capacitor 42. Audio amplifier buffer circuit 44 amplifies the analog signal to create an audio output signal. The audio output signal is provided to capacitor 42. Capacitor 42 blocks DC bias from the audio output signal which is then provided to the sound output device 18. The sound output device 18 is shown as speaker 18 for generating sound waves to notify the operator that an event has occurred.

Figure 2:
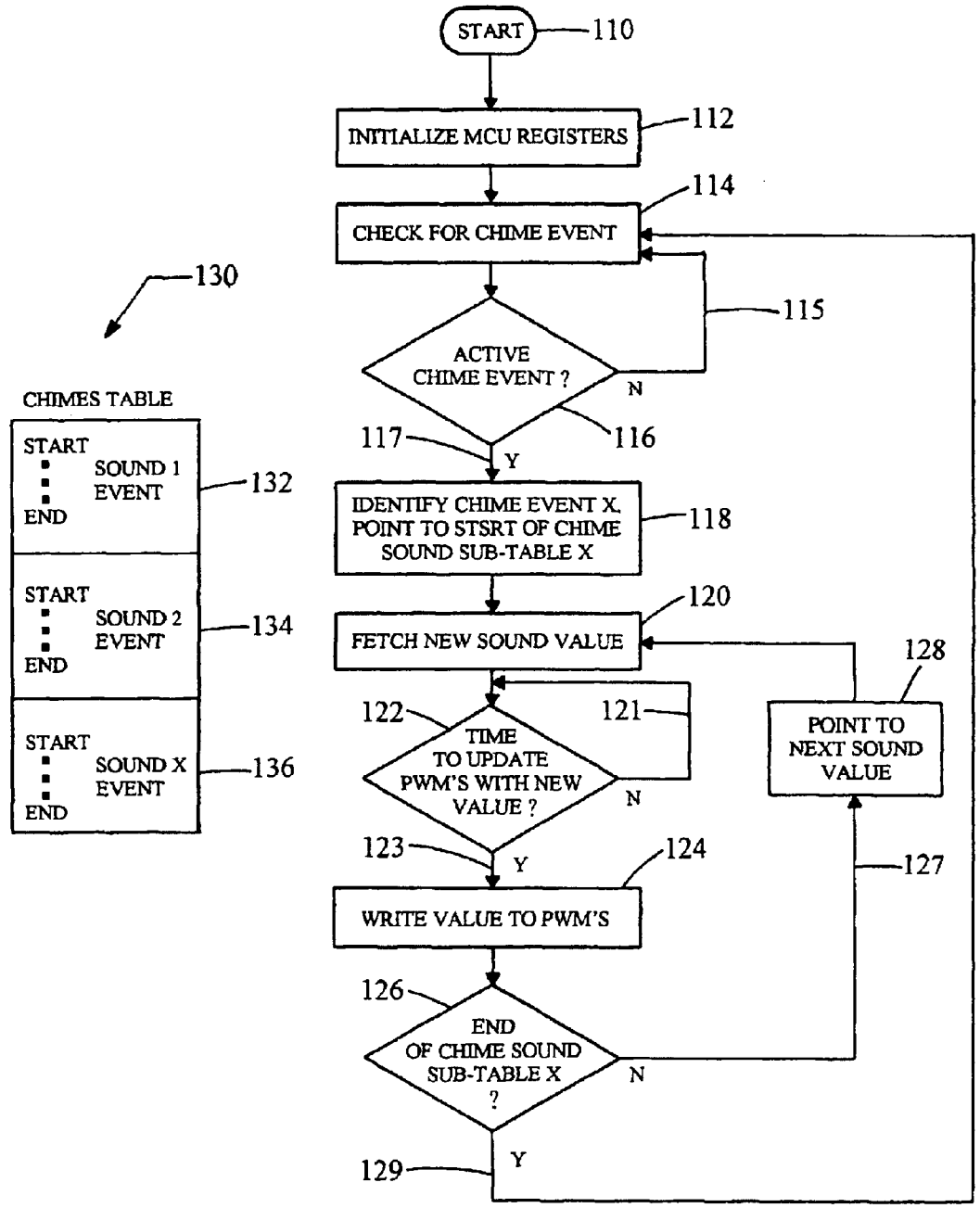
FIG. 2 is a flow chart of a method for generating an analog signal to produce sound according to an embodiment of the present invention.

Now referring to FIG. 2, a flow chart describing the functioning of the micro-controller is provided. The oval 110 indicates the start of the process flow. Next, the micro-controller is initialized as indicated by box 112. The micro-controller checks for a control signal indicating a chime event has occurred as denoted by box 114. In decision diamond 116, the active status of the chime event is determined. If the chime event is not active, the logic flow follows path 115 and checks for another control signal indicative of a chime event as denoted by box 114. However, if the chime event is active as determined by decision diamond 116, the logic flow follows along path 117 and the chime event is identified as denoted by box 118. Also indicated in box 118, the processor is set to the start point of a chime sound table associated with the event.

The chime table 130 includes many sound sub-tables as denoted by sub-tables 132, 134, and 136. The sound sub-tables 132, 134, 136 are associated with particular events or control signals. Each sound sub-table contains a series of entry values wherein the series of entry values is indicative of a sound or series of sounds to be generated in response to the event.

As denoted by block 120, an entry value from the sound sub-table is retrieved. Next, a decision is made whether it is time to update the pulse width modulators with a new value as indicated by decision block 122. As indicated by return path 121, the logic flow delays updating the PWMs with a new value until the correct time. At the correct time, the logic flow from block 122 follows path 123 and the entry values are written to the pulse width modulators as denoted by block 124. According to the decision diamond 126, the sound sub-table is checked to see if the end of the sound sub-table has been reached. If the end of the sound table has not been reached, the logic flow follows along path 127 and the micro-controller is set to the next entry value as indicated by box 128. After the new entry value is retrieved in box 120 the logic flows as previously described. However, if the end of the sound table has been reached in decision diamond 126, the logic flow follows along path 129 and the micro-controller checks for new control signals indicating a chime event as denoted by box 114. Thereafter, the logic flow follows the path previously described from box 114.

As a person skilled in the art will readily appreciate, the above description is meant as an illustration of implementation of the principles this invention is not intended to limit the scope or application of this invention is susceptible to modification, variation and change, without departing from spirit of this invention, as defined in the following claims.

I claim:

1. A system for generating an analog signal to produce sound comprising:
   a control circuit having a memory;
   a first pulse width modulator in communication with the control circuit, the first pulse width modulator having a count range of 0 to Z and a duty factor of D for providing a first signal component;
   a second pulse width modulator in communication with the control circuit, the second pulse width modulator having a count range of 0 to Y and a duty factor of C for extruding a second signal component;
   a first and second resistor, the first resistor being in communication with the first pulse width modulator and having a resistance ratio relative to the second resistor of Y*(Z+1)*D/Z*C, the second resistor being in communication with the second pulse width modulator; and
   a common node in communication with the first and second resistors for mixing the first and second signal components to produce the analog signal.

2. The system according to claim 1, further comprising an audio output device in communication with the common node.

3. The system according to claim 2, wherein the audio output device includes a speaker.

4. The system according to claim 1, further comprising an audio amplifier circuit in communication with the common node.

5. The system according to claim 4, wherein the audio amplifier circuit includes a capacitor in communication with an audio output device on a first end and a audio amplifier on a second end.

6. The system according to claim 1, further comprising a filter circuit in communication with the common node.

7. The system according to claim 6, wherein the filter circuit includes a scaling resistor for scaling the analog signal, the scaling resistor being connected between the common node and a low impedance voltage reference.

8. The system according to claim 6, wherein the filter circuit includes a capacitor for filtering the analog signal, the capacitor being connected between the common node and a low impedance voltage reference.

9. The system according to claim 1, wherein the memory of the control circuit contains a sound table.

10. The system according to claim 9, wherein the sound table includes a plurality of value entries indicative of a plurality of sounds to create a chime.

11. A system for generating an analog signal to produce sound comprising;
    a control circuit having a memory;
    a first pulse width modulator in communication with the control circuit, the first pulse width modulator having count range of 0 to Z and a duty factor of D;
    a second pulse width modulator in communication with the control circuit, the second pulse width modulator having count range of 0 to Y and a duty factor of C;
    a third pulse width modulator in communication with the control circuit, the third pulse width modulator having count range of 0 to X and a duty factor of B;
    a first resistor in communication with the first pulse width modulator;
    a second resistor in communication with the second pulse width modulator;
    a third resistor in communication with the third pulse width modulator; and
    a common node in communication with the first, second, and third resistors,
    wherein the first resistor has a resistance ratio relative to the third resistor of (X*(Y+1)*(Z+1))*D/Z*B,
    the second resistor has a resistance ratio relative to the third resistor of (X*(Y+1)*(Z+1))*C/(Y*(Z+1)*B).

12. The system according to claim 11, further comprising an audio output device in communication with the common node.

13. The system according to claim 12, wherein the audio output device includes a speaker.

14. The system according to claim 11, further comprising an audio amplifier circuit in communication with the common node.

15. The system according to claim 14, wherein the audio amplifier circuit includes a capacitor in communication with an audio output device on a first end and a audio amplifier on a second end.

16. The system according to claim 11, further comprising a filter circuit in communication with the common node.

17. The system according to claim 16, wherein the filter circuit includes a scaling resistor for scaling the analog signal, the scaling resistor being connected between the common node and a low impedance voltage reference.

18. The system according to claim 16, wherein the filter circuit includes a capacitor for filtering the analog signal, the capacitor being connected between the common node and a low impedance voltage reference.

19. The system according to claim 11, wherein the memory of the control circuit contains a sound table.

20. The system according to claim 19, wherein the sound table includes a plurality of value entries indicative of a plurality of sounds to create a chime.

21. A system for generating an analog signal to produce sound comprising;
a control circuit storing a digital value;
a first pulse width modulator in communication with the control circuit, the first pulse width modulator having count range of 0 to Z and a duty factor of D;
a second pulse width modulator in communication with the control circuit, the second pulse width modulator having count range of 0 to Y and a duty factor of C;
a third pulse width modulator in communication with the control circuit, the first pulse width modulator having count range of 0 to X and a duty factor of B;
a fourth pulse width modulator in communication with the control circuit, the second pulse width modulator having count range of 0 to W and a duty factor of A;
a first resistor in communication with the first pulse width modulator;
a second resistor in communication with the second pulse width modulator;
a third resistor in communication with the third pulse width modulator;
the fourth resistor being in communication with the fourth pulse width modulator; and
a common node in communication with the first, second, third, and fourth resistors;
wherein the third resistor has a resistance ratio relative to the fourth resistor of $(W*(X+1)*(Y+1)*(Z+1))*B/(X*(Y+1)*(Z+1)*A)$;
wherein the second resistor a resistance ratio relative to the fourth resistor of $(W*(X+1)*(Y+1)*(Z+1))*C/(Y*(Z+1)*A)$; and
wherein the first resistor has a resistance ratio relative to the fourth resistor of $(W*(X+1)*(Y+1)*(Z+1))*D/Z*A$.

22. The system according to claim 21, further comprising an audio output device in communication with the common node.

23. The system according to claim 22, wherein the audio output device includes a speaker.

24. The system according to claim 21, further comprising an audio amplifier circuit in communication with the common node.

25. The system according to claim 24, wherein the audio amplifier circuit includes a capacitor in communication with an audio output device on a first end and a audio amplifier on a second end.

26. The system according to claim 21, further comprising a filter circuit in communication with the common node.

27. The system according to claim 26, wherein the filter circuit includes a scaling resistor for scaling the analog signal, the scaling resistor being connected between the common node and a low impedance voltage reference.

28. The system according to claim 26, wherein the filter circuit includes a capacitor for filtering the analog signal, the capacitor being connected between the common node and a low impedance voltage reference.

29. The system according to claim 21, wherein the memory of the control circuit contains a sound table.

30. The system according to claim 29, wherein the sound table includes a plurality of value entries indicative of a plurality of sounds to create a chime.

31. A method for generating an audible signal to notify an operator of an event, the method comprising:
detecting an event using a control circuit;
determining a sound table associated with the event;
partitioning an entry value of sound table into a first and second place;
communicating the first place to a first pulse width modulator;
communicating the second place to a second pulse width modulator;
modulating a first pulse width for a first signal generated by the first pulse width modulator corresponding to the first place;
modulating a second pulse width for a second signal generated by the second pulse width modulator corresponding to the second place;
scaling the amplitude of the first signal using a first resistor in communication with the first pulse width modulator, wherein the scaling of the first signal corresponds to the first place;
scaling the amplitude of the second signal using a second resistor in communication with the second pulse width modulator, wherein the scaling corresponds to the second place;
mixing the first and second signals in a summing node to create a third signal corresponding to the entry value determined by the control circuit; and
generating a sound wave corresponding to the entry value using the third signal.

32. The method according to claim 31 further comprising retrieving a plurality of entry values from the sound table.

33. The method according to claim 32 further comprising synchronizing the communication of the first and second place corresponding to each entry value of the plurality of entry values with a time to generate a plurality of sounds.

* * * * *